(12) United States Patent
John Wilson et al.

(10) Patent No.: US 11,039,327 B2
(45) Date of Patent: Jun. 15, 2021

(54) SYSTEM INFORMATION MONITORING

(71) Applicant: QUALCOMM Incorporated, San Diego, CA (US)

(72) Inventors: Makesh Pravin John Wilson, San Diego, CA (US); Tao Luo, San Diego, CA (US); Heechoon Lee, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 16/250,773

(22) Filed: Jan. 17, 2019

(65) Prior Publication Data

US 2019/0230534 A1 Jul. 25, 2019

Related U.S. Application Data

(60) Provisional application No. 62/620,416, filed on Jan. 22, 2018.

(51) Int. Cl.
*H04W 24/08* (2009.01)
*H04W 48/12* (2009.01)
*H04W 72/04* (2009.01)

(52) U.S. Cl.
CPC ............ *H04W 24/08* (2013.01); *H04W 48/12* (2013.01); *H04W 72/0446* (2013.01); *H04W 72/042* (2013.01)

(58) Field of Classification Search
CPC .................................................... H04W 24/08
See application file for complete search history.

(56) References Cited

U.S. PATENT DOCUMENTS

2016/0302234 A1\* 10/2016 Martinez Tarradell ...................... H04W 74/006
2019/0021119 A1\* 1/2019 Ng ...................... H04W 72/042
(Continued)

FOREIGN PATENT DOCUMENTS

WO  WO-2018008916 A2  1/2018

OTHER PUBLICATIONS

Huawei et al., "RMSI Delivery", 3GPP Draft, R1-1719372, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369281, 9 Pages, Retrieved from the Internet: URL:http://www.3gpp.org/ftp/tsg%5Fran/WG1%5FRL1ITSGR1%5F91/Docs/ [retrieved on Nov. 18, 2017].
(Continued)

*Primary Examiner* — Edan Orgad
*Assistant Examiner* — Won Tae C Kim
(74) *Attorney, Agent, or Firm* — Kevin M. Donnelly

(57) ABSTRACT

Various aspects of the present disclosure generally relate to wireless communication. In some aspects, a user equipment (UE) may determine a remaining minimum system information control resource set (RMSI CORESET) monitoring configuration based at least in part on information received by the UE in a first frame; and monitor, during a second frame and based at least in part on the RMSI CORESET monitoring configuration, for an RMSI CORESET based at least in part on a synchronization signal block (SSB), associated with the RMSI CORESET, that is received in the first frame.

10 Claims, 9 Drawing Sheets

(56) References Cited

U.S. PATENT DOCUMENTS

2019/0159203 A1* 5/2019 Kim .................. H04L 5/0053
2019/0230696 A1* 7/2019 Kim .................. H04W 74/0833

OTHER PUBLICATIONS

International Search Report and Written Opinion—PCT/US2019/014231—ISA/EPO—dated Mar. 25, 2019.

NTT Docomo et al., "Remaining Issues on Remaining Minimum System Information", 3GPP Draft; R1-1800651_ Remaining Issues on Remaining Minimum System Information_Final2, 3rd Generation Partnership Project (3GPP), Mobile Competence Centre, 650, Route Des Lucioles, F-06921 Sophia-Antipolis Cedex, France, vol. RAN WG1, No. Vancouver, Canada; Jan. 22, 2018-Jan. 26, 2018, Jan. 13, 2018, XP051384973, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], 5 pages.

Qualcomm Incorporated: "Paging Design Consideration", 3GPP Draft; R1-1800849, 3rd Generation Partnership Project (3GPP), Mobile Competence Centre, 650, Route Des Lucioles, F-06921 Sophia-Antipolis Cedex, France, vol. RAN WG1, No. Vancouver, Canada; Jan. 22, 2018-Jan. 26, 2018 Jan. 13, 2018, XP051385121, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], 11 pages.

\* cited by examiner

SYSTEM INFORMATION MONITORING

CROSS-REFERENCE TO RELATED APPLICATIONS UNDER 35 U.S.C. § 119

This application claims priority to U.S. Provisional Patent Application No. 62/620,416, filed on Jan. 22, 2018, entitled "TECHNIQUES AND APPARATUSES FOR RMSI MONITORING IN 5G/NEW RADIO," which is hereby expressly incorporated by reference herein.

FIELD OF THE DISCLOSURE

Aspects of the present disclosure generally relate to wireless communication, and more particularly to techniques and apparatuses for system information monitoring in wireless communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include determining a remaining minimum system information control resource set (RMSI CORESET) monitoring configuration based at least in part on information received by the UE in a first frame; and monitoring, during a second frame and based at least in part on the RMSI CORESET monitoring configuration, for an RMSI CORESET based at least in part on a synchronization signal block (SSB), associated with the RMSI CORESET, that is received in the first frame.

In some aspects, a UE for wireless communication may include memory and one or more processors operatively coupled to the memory. The memory and the one or more processors may be configured to determine an RMSI CORESET monitoring configuration based at least in part on information received by the UE in a first frame; and monitor, during a second frame and based at least in part on the RMSI CORESET monitoring configuration, for an RMSI CORESET based at least in part on a SSB, associated with the RMSI CORESET, that is received in the first frame.

In some aspects, a non-transitory computer-readable medium may store one or more instructions for wireless communication. The one or more instructions, when executed by one or more processors of a UE, may cause the one or more processors to determine an RMSI CORESET monitoring configuration based at least in part on information received by the UE in a first frame; and monitor, during a second frame and based at least in part on the RMSI CORESET monitoring configuration, for an RMSI CORESET based at least in part on a SSB, associated with the RMSI CORESET, that is received in the first frame.

In some aspects, an apparatus for wireless communication may include means for determining an RMSI CORESET monitoring configuration based at least in part on information received by the apparatus in a first frame; and means for monitoring, during a second frame and based at least in part on the RMSI CORESET monitoring configuration, for an RMSI CORESET based at least in part on a SSB, associated with the RMSI CORESET, that is received in the first frame.

In some aspects, a method of wireless communication performed by a base station may include transmitting information indicating a remaining minimum system information control resource set (RMSI CORESET) monitoring configuration for a first frame; and transmitting, during a second frame and in accordance with the RMSI CORESET monitoring configuration, an RMSI CORESET associated with a synchronization signal block (SSB) that was transmitted in the first frame.

In some aspects, a base station for wireless communication may include memory and one or more processors operatively coupled to the memory. The memory and the one or more processors may be configured to transmit information indicating a remaining minimum system information control resource set (RMSI CORESET) monitoring configuration for a first frame; and transmit, during a second frame and based at least in part on the RMSI CORESET monitoring configuration, an RMSI CORESET associated with a synchronization signal block (SSB) that was transmitted in the first frame.

In some aspects, a non-transitory computer-readable medium may store one or more instructions for wireless communication. The one or more instructions, when executed by one or more processors of a base station, may cause the one or more processors to transmit information indicating a remaining minimum system information control resource set (RMSI CORESET) monitoring configuration for a first frame; and transmit, during a second frame and in accordance with the RMSI CORESET monitoring configuration, an RMSI CORESET associated with a synchronization signal block (SSB) that was transmitted in the first frame.

In some aspects, an apparatus for wireless communication may include means for transmitting information indicating a remaining minimum system information control resource set (RMSI CORESET) monitoring configuration for a first frame; and means for transmitting, during a second frame and in accordance with the RMSI CORESET monitoring configuration, an RMSI CORESET associated with a synchronization signal block (SSB) that was transmitted in the first frame.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
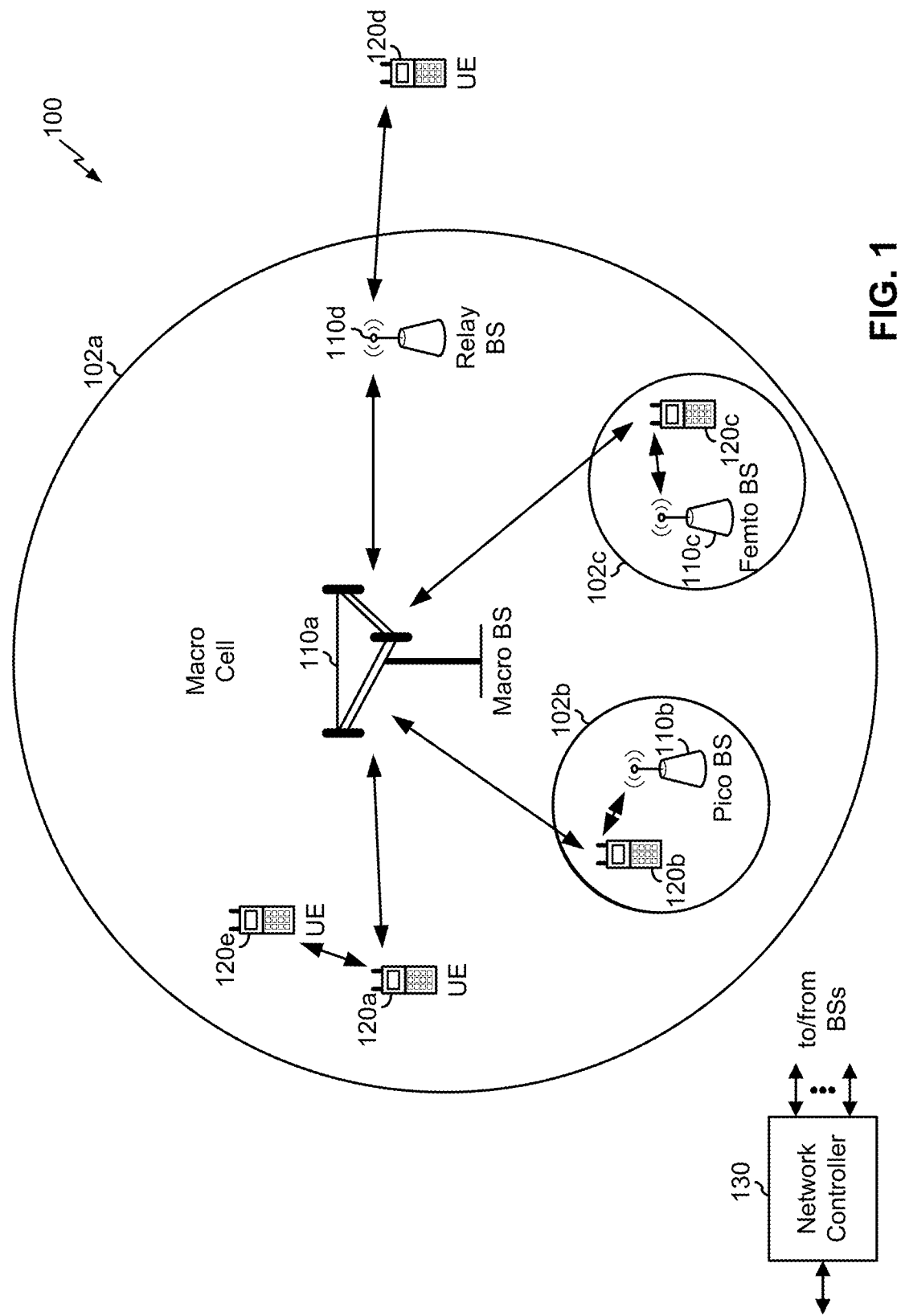
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
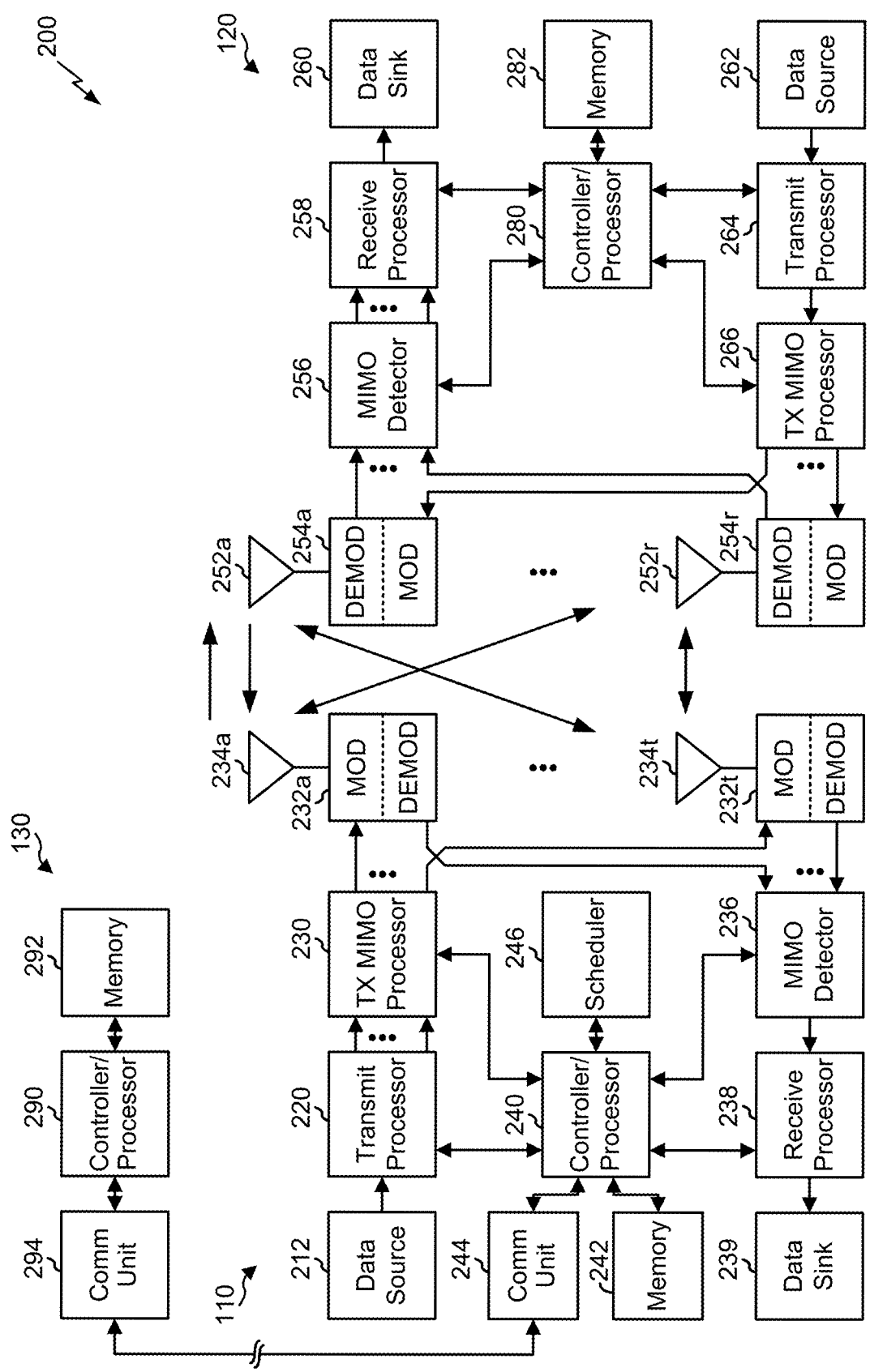
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with RMSI monitoring in 5G/NR, as described in more detail elsewhere herein. For example, controller/processor 240 of BS 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for determining a remaining minimum system information control resource set (RMSI CORESET) monitoring configuration based at least in part on information received by the UE in a first frame, means for monitoring, during a second frame and based at least in part on the RMSI CORESET monitoring configuration, for an RMSI CORESET based at least in part on a synchronization signal block (SSB), associated with the RMSI CORESET, that is received in the first frame, means for identifying one or more particular SSBs that are not to be transmitted based at least in part on the RMSI CORESET monitoring configuration, wherein the one or more particular SSBs are not to be transmitted based at least in part on an index value determination associated with the one or more particular SSBs, means for determining a modification period based at least in part on the RMSI CORESET monitoring configuration, wherein the modification period is longer than the first time period, means for determining an index of a slot of the RMSI CORESET based at least in part on the RMSI CORESET monitoring configuration and the SSB, means for performing rate matching based at least in part on the SSB bitmap and the one or more particular SSBs, and/or the like. In some aspects, such means may include one or more components of UE 120 described in connection with FIG. 2.

In some aspects, BS 110 may include means for transmitting information indicating a remaining minimum system information control resource set (RMSI CORESET) monitoring configuration for a first frame; means for transmitting, during a second frame and in accordance with the RMSI CORESET monitoring configuration, an RMSI CORESET associated with a synchronization signal block (SSB) that was transmitted in the first frame; means for determining a modification period based at least in part on the RMSI CORESET monitoring configuration, wherein the modification period is longer than the first frame; means for determining an index of a first slot of the RMSI CORESET based at least in part on the RMSI CORESET monitoring configuration and the SSB; means for determining a location associated with the SSB based at least in part on an SSB bitmap, an index value of the SSB, and the RMSI CORESET monitoring configuration; and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3A:
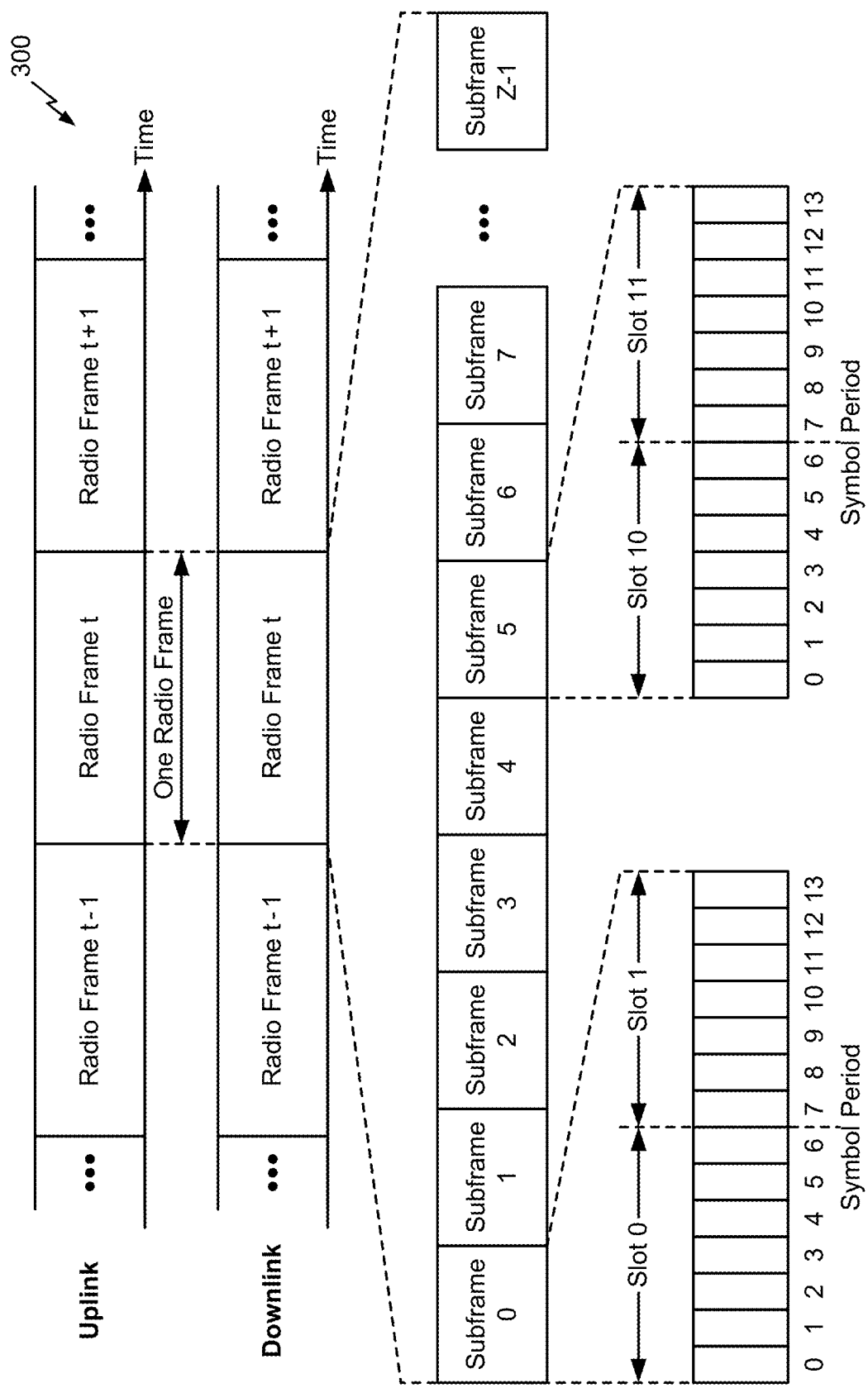
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z-1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
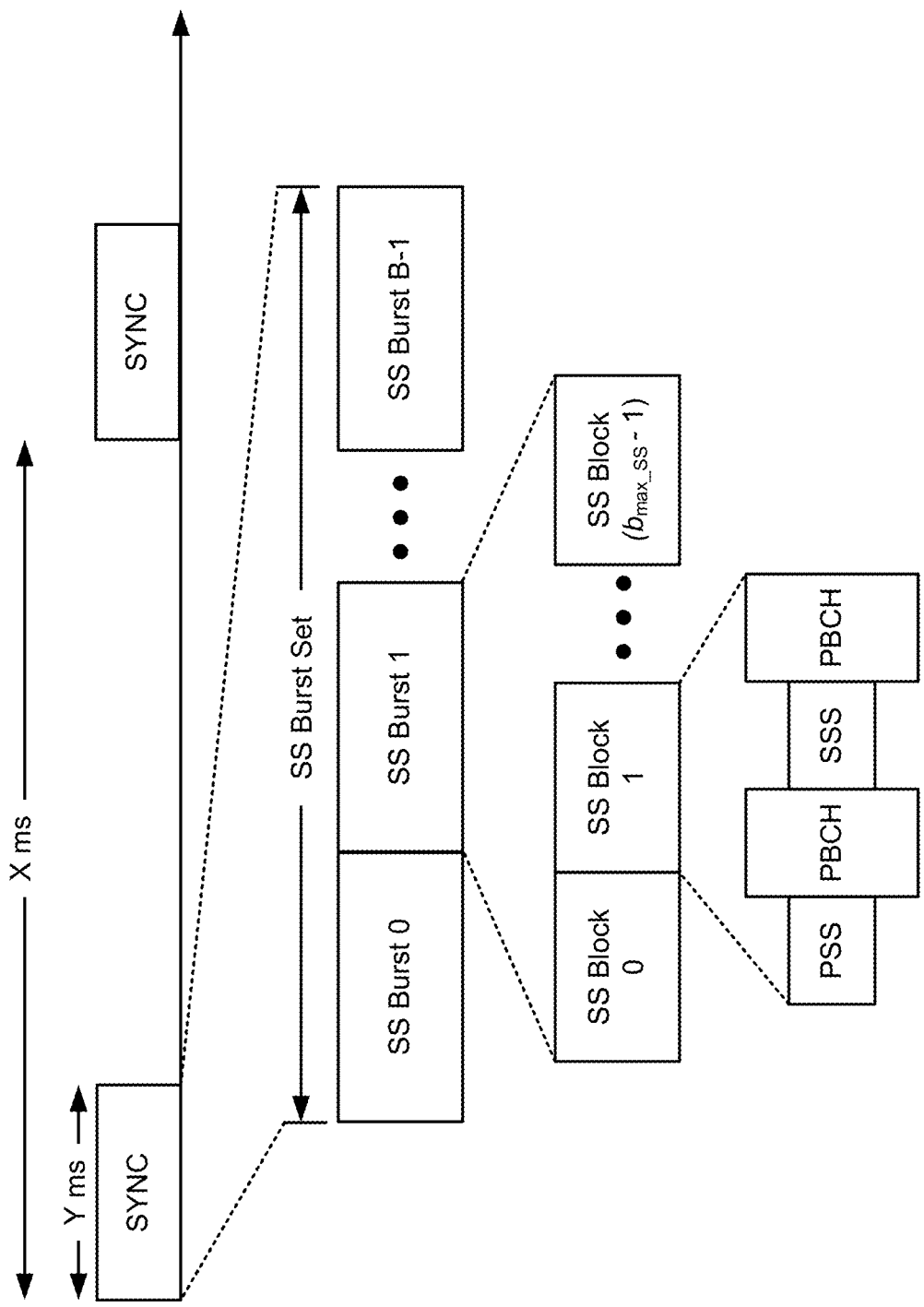
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
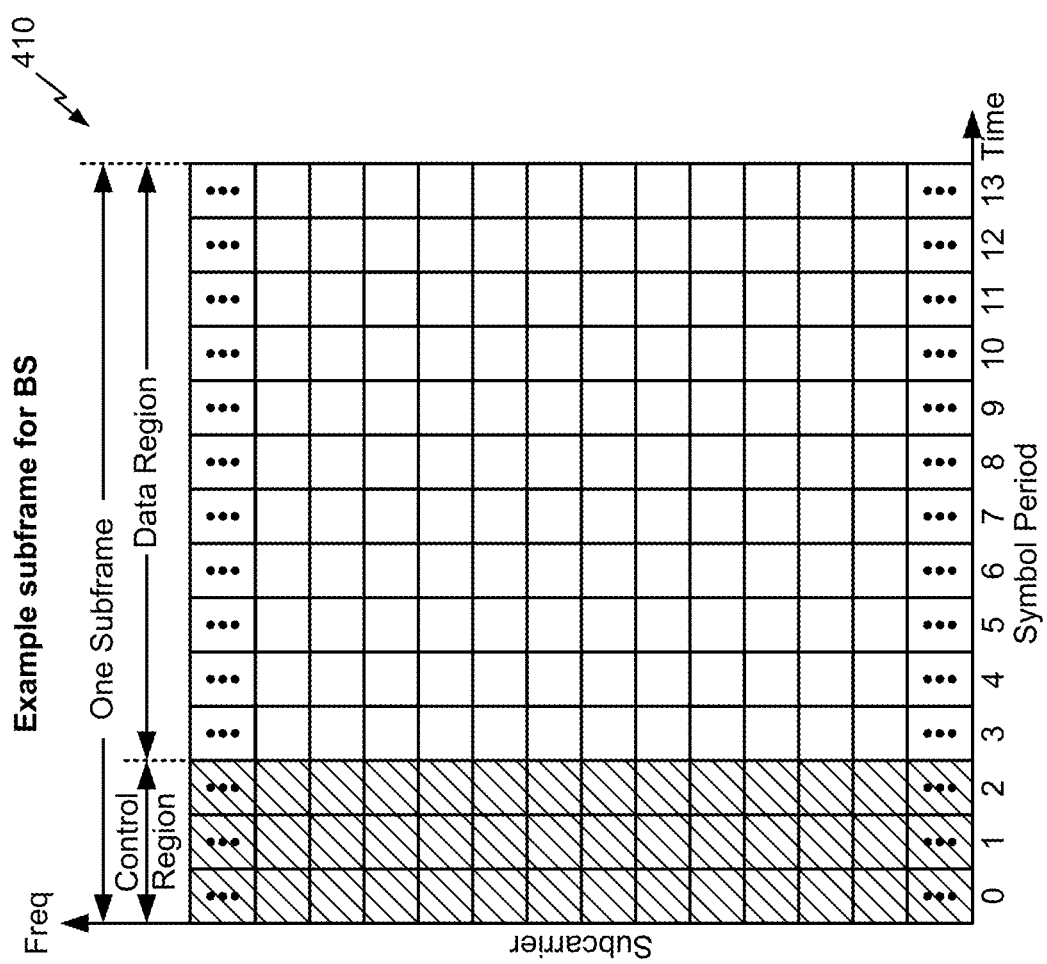
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where q ∈{0, . . . , Q-1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

A BS may configure a UE based at least in part on system information that is provided to the UE in a control resource set (CORESET). For example, the UE may monitor particular resources associated with the CORESET to receive the system information. One example of such system information is remaining minimum system information (RMSI), sometimes referred to as a SIB1. The BS may signal an RMSI CORESET monitoring configuration to the UE (e.g., in a PBCH and/or the like). The RMSI CORESET monitoring configuration (e.g., frequency and time domain resources of the RMSI) may be specified in a table. The UE may derive a CORESET monitoring occasion from an SSB index of the PBCH and one or more bits of the PBCH. The UE may monitor for an RMSI CORESET at the CORESET monitoring occasion. For example, the PBCH may be received at a beginning of a monitoring period, and may indicate where, in the monitoring period, one or more RMSI CORESETs will be received. In some aspects, a RMSI CORESET may be referred to as a control resource set for a Type0-PDCCH common search space.

The RMSI CORESET monitoring configuration, in some configurations, may be invalid for certain SSB indices. For example, consider the following legacy rule:

For an SS/PBCH block with index i, the UE determines an index of the first slot of the RMSI CORESET as $n_0=(O*2^\mu+[i*M]) \bmod N_{slot}^{frame,\mu}$, wherein $n_0$ is located in a frame with a system frame number (SFN) satisfying SFN mod 2=0 if $n_0=(O*2^\mu+[i*M])/N_{slot}^{frame,\mu}=0$ or in a frame with an SFN satisfying SFN mod 2=1 if $n_0=(O*2^\mu+[i*M])/N_{slot}^{frame,\mu}=1$.

In this legacy rule, O is a time offset of the RMSI CORESET from a corresponding SSB, M is a repetition frequency, in slots, of the RMSI CORESET, μ is a numerology index, $N_{slot}^{frame,\mu}$ is a number of slots per frame, and $n_0$ is a first slot of an RMSI CORESET monitoring occasion. The above rule may be invalid for SS/PBCH block indexes (e.g., i) greater than 60 when O is equal to 5 and M is equal to 2. This may mean that a subset of SS/PBCH block indexes (e.g., block indexes 60 through 63) are unusable in this configuration.

Some techniques and apparatuses described herein provide a rule for determination of an RMSI CORESET monitoring occasion that is not invalid in the above case. For example, some techniques and apparatuses described herein may provide an RMSI CORESET monitoring occasion, associated with a given SS block, that occurs after the transmission of the SS block (e.g., in a next time period after the SS block is transmitted). The UE may determine the RMSI CORESET monitoring occasion according to the rule and based at least in part on the given SS block, and may monitor the next time period based at least in part on the given SS block. In some aspects, the UE may determine that invalid SS blocks, such as SS blocks associated with block indexes 60 through 63, are not to be transmitted based at least in part on the RMSI CORESET monitoring configuration of the UE. In this way, the UE improves performance of RMSI signaling by eliminating an invalid SS block configuration or by determining that particular SS blocks are not to be transmitted based at least in part on the RMSI CORESET monitoring configuration of the UE.

Figure 5:
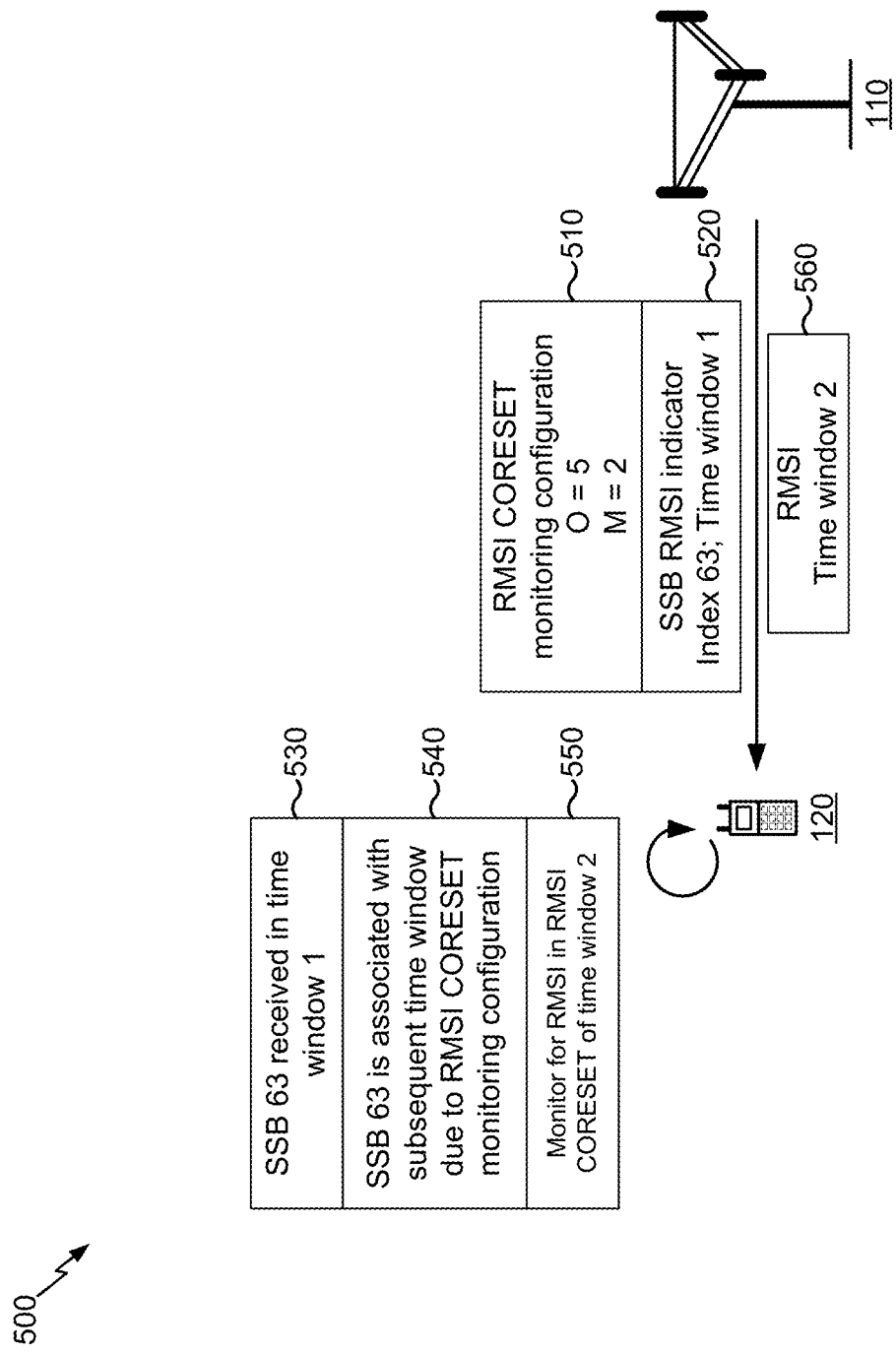
FIG. 5 is a diagram illustrating an example of RMSI monitoring based at least in part on an RMSI CORESET monitoring configuration, in accordance with various aspects of the present disclosure.

FIG. 5 is a diagram illustrating an example 500 of RMSI monitoring based at least in part on an RMSI CORESET monitoring configuration, in accordance with various aspects of the present disclosure. As shown in FIG. 5, and by reference number 510, a BS 110 may provide information identifying an RMSI CORESET monitoring configuration to a UE 120. As further shown, the RMSI CORESET monitoring configuration may identify a time offset (e.g., O) of 5 ms and an interval (e.g., M), in slots, of an RMSI CORESET. For example, O and M may be defined according to 3GPP Technical Specification (TS) 36.213 (e.g., Table 13-10 and/or elsewhere). When an RMSI CORESET monitoring occasion corresponding to some SSB indexes is determined using the legacy rule described above (e.g., according to 3GPP TS 36.213), certain SSB indexes (e.g., SSB indexes 60 through 63) may be invalid.

Techniques and apparatuses described herein use a certain rule for determination of a slot (e.g., a first slot) of an RMSI CORESET corresponding to an SSB with a particular SSB index. For example, the particular rule may be configured so that certain SSB indexes (e.g., SSB indexes 60 through 63) are not invalid. As one example, the particular rule may be as follows:

For an SS/PBCH block with index i, the UE determines an index of the first slot of the RMSI CORESET as $n_0 = (O*2^\mu + [i*M]) \bmod N_{slot}^{frame,\mu}$, wherein $n_0$ is located in a frame with a system frame number (SFN) satisfying SFN mod $2 = ((O*2^\mu + [i*M])/N_{slot}^{frame,\mu}) \bmod 2$.

In such a case, the RMSI CORESET monitoring occasion associated with a given SSB occurs after the transmission of the SSB. This reduces buffering requirements, since the RMSI CORESET associated with the given SSB will not need to be buffered for retroactive identification based at least in part on the given SSB. Further, by using the particular rule, the certain SSB indexes (e.g., 60 through 63) are not invalid. Thus, a variety of possible SSB indexes is increased and performance of the RMSI signaling is improved.

SFN mod 2=xmod 2 may be equivalent to SFN mod 2=0 if $(O*2^\mu + [i*M])/N_{slot}^{frame,\mu}) \bmod 2=0$, and may be equivalent to SFN mod 2=1 if $(O*2^\mu + [i*M])/N_{slot}^{frame,\mu}) \bmod 2=1$.

In some aspects (e.g., when using the legacy rule), the UE 120 may determine that certain SSBs are invalid for the RMSI CORESET monitoring configuration identified by reference number 510. In this case, the UE 120 may determine that the certain SSBs, and/or RMSI CORESETs associated with the certain SSBs, are not to be monitored by the UE 120 and/or transmitted by a corresponding BS 110. For example, the UE 120 may receive SSB configuration information (e.g., in an RMSI payload or in another way). The SSB configuration information may include an SSB bitmap. The SSB bitmap may include a first group of 8 bits and a second group of 8 bits. The first group of 8 bits may indicate which SSB groups (e.g., of consecutive SSBs) are to be transmitted, and the second group of 8 bits may indicate which particular SSBs, of an SSB group, are to be transmitted.

For example, a bitmap of 11111111 11111111 may indicate that eight SSB groups are to be transmitted, and that all eight SSBs of each SSB group are to be transmitted. The UE 120 may determine that particular SSBs are not to be transmitted irrespective of values of the bitmap. Another example is, for a certain RMSI monitoring configuration, and a signaled SSB bitmap of 11111111 00001111, the UE will determine that, for each of the first 7 groups, only the last 4 SSBs in the group are transmitted, but for the $8^{th}$ group, no SSB in the group is transmitted. Continuing the above example, the UE 120 may determine that SSBs associated with indexes 60 through 63 are not to be transmitted based at least in part on the RMSI CORESET monitoring configuration, even though the bitmap indicates that all SSBs are to be transmitted. Thus, the UE 120 may not monitor particular SSBs and/or corresponding RMSI CORESETs based at least in part on the RMSI CORESET monitoring configuration and/or the bitmap, which improves efficiency and conserves monitoring resources.

In some aspects, the UE 120 may determine invalid SSB locations for rate-matching behavior (e.g., for the PDSCH of the UE 120) based on the SSB bitmap signaled in the RMSI payload, the SSB index, and the RMSI CORESET monitoring configuration. In some aspects, the UE 120 may determine a bitmap, based at least in part on the RMSI CORESET monitoring configuration, that may indicate invalid SSB indexes. The UE 120 may perform an operation (e.g., an AND operation) to combine the SSB bitmap and the bitmap that may indicate invalid SSB indexes. In this way, the UE 120 may identify invalid SSB locations, and may perform rate matching based at least in part on the invalid SSB locations (e.g., by using resources of the invalid SSB locations for rate matching).

As shown by reference number 520, the UE 120 may receive an SSB with an RMSI indicator from the BS 110. As further shown, the SSB may be associated with an SSB index of 63. Thus, the SSB may be one of the SSBs that is invalid under the legacy rule, and valid under the particular rule described herein. As further shown, the UE 120 may receive the SSB in a first time window (e.g., time window 1). For example, the first time window may include a first frame, a first set of frames, a first search space, and/or the like. As shown by reference number 530, the UE 120 may determine that the SSB is received in the first time window.

As shown by reference number 540, the UE 120 may determine that the SSB is associated with an RMSI CORE-SET in a subsequent time window (e.g., time window 2) due to the RMSI CORESET monitoring configuration (e.g., due to the SSB index being invalid when using the legacy rule and valid when using the particular rule described herein). For example, the subsequent time window may include a second frame, a second set of frames, a second search space, and/or the like. In some aspects, the UE 120 may determine a slot (e.g., a first slot no) of the RMSI CORESET according to the particular rule described herein.

In some aspects, a modification period of UE 120 may be configured based at least in part on the RMSI CORESET monitoring configuration. A modification period is a period in which a change of system information can be received after a first value of the system information is received. For example, the concept of a modification period may be defined in 3GPP TS 36.331 Section 5.2.1.3. The modification period may need to be sufficiently long to encompass the first time window (e.g., the first frame) and at least a portion of the second time window (e.g., the second frame). As a more particular example, assume that a UE 120 is associated with a legacy modification period of 640 ms and assume that SSBs of the UE 120 are all received in a period of 20 ms. Assume further that the UE 120 is associated with a first time RMSI CORESET monitoring configuration that indicates that the RMSI CORESET corresponding to one or more SSBs of the UE 120 occur after the period of 20 ms. In that case, the modification period may be equal to 640 ms plus an additional length of time. For example, the additional length of time may be a function of the RMSI CORESET monitoring configuration. In some aspects, the additional length of time may encompass the SSBs and the RMSI CORESET corresponding to the one or more SSBs.

As shown by reference number 550, the UE 120 may monitor for the RMSI in the RMSI CORESET of the second time window. For example, the UE 120 may monitor for a physical downlink control channel that carries the RMSI in one or more slots identified using the particular rule described herein. As shown by reference number 560, the UE 120 may receive the RMSI in the second time window. Thus, the UE 120 may identify the RMSI CORESET based at least in part on the MIB, then may monitor a common search space of the RMSI CORESET for the RMSI.

As indicated above, FIG. 5 is provided as an example. Other examples are possible and may differ from what was described with respect to FIG. 5.

Figure 6:
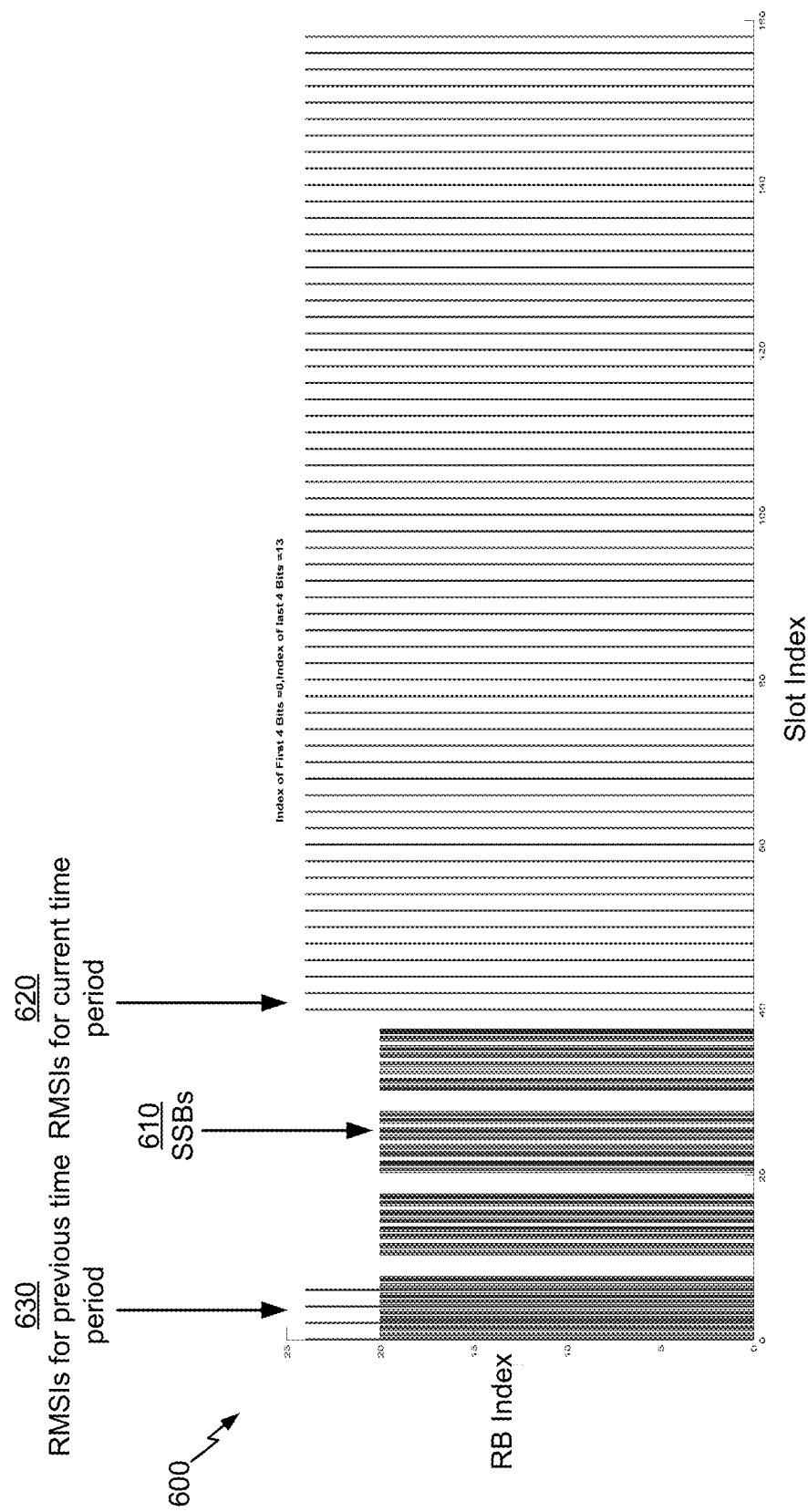
FIG. 6 is a diagram illustrating an example of a synchronization signal block (SSB) and RMSI configuration, in accordance with various aspects of the present disclosure.

FIG. 6 is a diagram illustrating an example 600 of a synchronization signal block (SSB) and RMSI configuration, in accordance with various aspects of the present disclosure. In FIG. 6, the horizontal axis denotes slots (e.g., time) and the vertical axis denotes a resource block index of a resource block received in a corresponding slot. In other words, a vertical bar in FIG. 6 may denote that an SSB or RMSI was received in a slot with the slot index identified by the horizontal axis.

As shown by reference number 610, SSBs are shown by shorter vertical bars. As further shown, SSBs may be received at the beginning of a time period shown in FIG. 6. For example, the time period shown in FIG. 6 may correspond to a modification period that includes a plurality of frames. Each SSB may correspond to an RMSI and/or an RMSI CORESET, shown by reference numbers 620 and 630. For example, when the UE 120 receives an SSB with a particular SSB index, the UE 120 may identify resources associated with the corresponding RMSI and/or RMSI CORESET using the particular SSB index. Reference number 620 shows RMSIs corresponding to SSBs of the current time period (e.g., the SSBs shown in FIG. 6). Reference number 630 shows RMSIs corresponding to SSBs of a previous time period (not shown). For example, the UE 120 may identify the RMSIs corresponding to the SSBs of the previous time period using the particular rule described herein. In some aspects, the additional window described above in association with the modification period may correspond to the RMSIs shown by reference number 630.

In this way, the UE 120 may identify RMSI CORESET resources of a subsequent frame or time period based at least in part on an SSB received in an initial frame or time period, which allows the usage of SSBs that were previously invalid when using the legacy rule.

As indicated above, FIG. 6 is provided as an example. Other examples are possible and may differ from what was described with respect to FIG. 6

Figure 7:
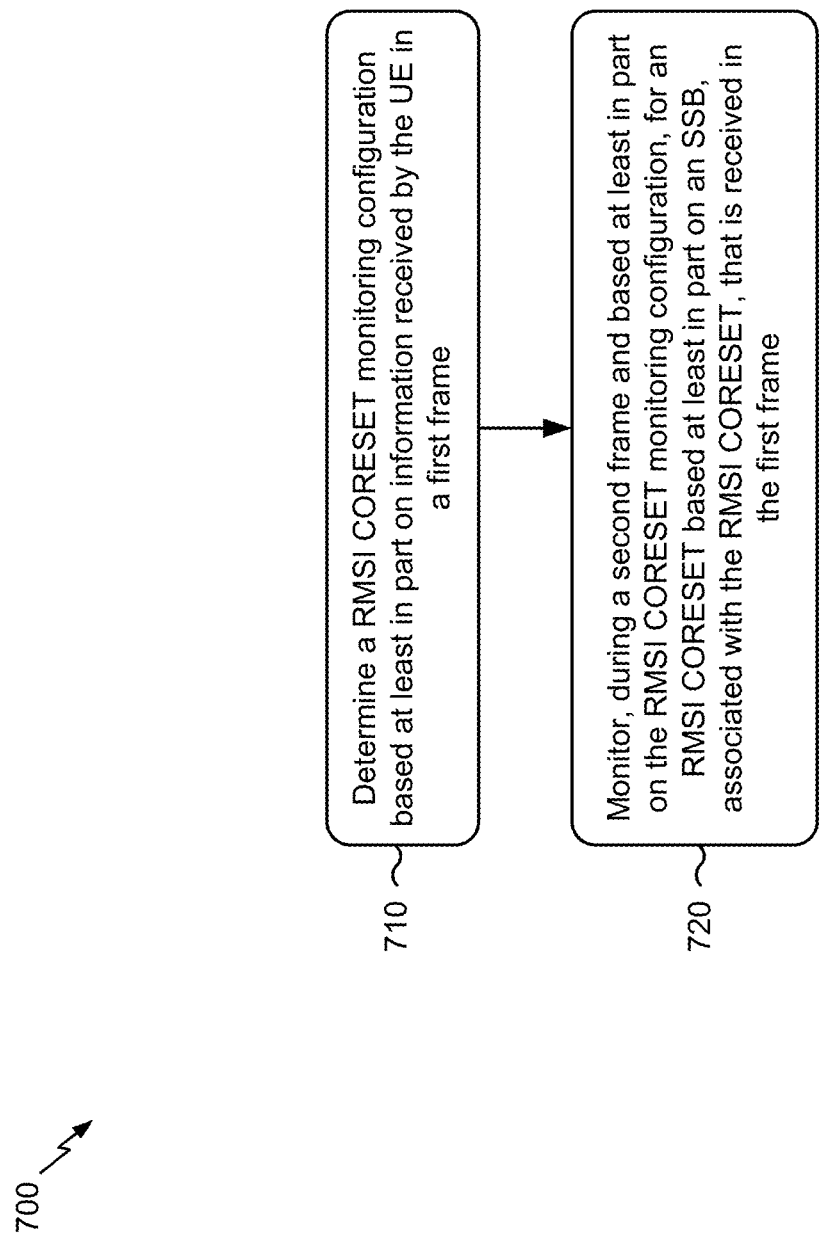
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs determination of an RMSI according to a particular rule described herein.

As shown in FIG. 7, in some aspects, process 700 may include determining an RMSI CORESET monitoring configuration based at least in part on information received by the UE in a first frame (block 710). For example, the UE may determine (e.g., using controller/processor 280 and/or the like) an RMSI CORESET monitoring configuration (e.g., based at least in part on information received from a BS, such as BS 110, and/or the like). The RMSI CORESET monitoring configuration may be based at least in part on information received by the UE in a first time period, referred to herein as a first frame (e.g., a first 20 ms period, a first frame or set of frames, a search space of the UE, etc.). In some aspects, the RMSI CORESET monitoring configuration may be associated with a legacy rule, wherein certain SSB indexes are invalid. In some aspects, the RMSI CORESET monitoring configuration may be associated with the particular rule described herein, in which case the certain SSB indexes are valid and may correspond to RMSI CORESETs of a subsequent time period.

As shown in FIG. 7, in some aspects, process 700 may include monitoring, during a second frame and based at least in part on the RMSI CORESET monitoring configuration, for an RMSI CORESET based at least in part on an SSB, associated with the RMSI CORESET, that is received in the first frame (block 720). For example, when the RMSI CORESET monitoring configuration is associated with the particular rule described herein, the UE may monitor (e.g., using controller/processor 280 and/or the like) for the RMSI CORESET in a second time window, referred to herein as a second frame. In some aspects, the UE may determine resources in which to monitor for the RMSI CORESET (e.g., using the particular rule described herein).

Process 700 may include additional aspects, such as any single aspect or any combination of aspects described below and/or in connection with one or more other processes described elsewhere herein.

In some aspects, the second frame occurs after the first frame. In some aspects, the RMSI CORESET is transmitted after the SSB associated with the RMSI CORESET. In some aspects, a length of the second frame is based at least in part on the RMSI CORESET monitoring configuration. In some aspects, the UE (e.g., using controller/processor 280 and/or the like) may determine a modification period based at least in part on the RMSI CORESET monitoring configuration, wherein the modification period is longer than the first time period. In some aspects, the UE (e.g., using controller/processor 280 and/or the like) may determine an index of a slot of the RMSI CORESET based at least in part on the RMSI CORESET monitoring configuration and the SSB. In some aspects, the RMSI CORESET monitoring configuration is associated with a time offset value of 5 and a repetition frequency of 2 slots, and the SSB is associated with an SSB index greater than 60. In some aspects, when the RMSI CORESET monitoring configuration is not associated with a time offset value of 5 and a repetition frequency of 2 slots, or when the SSB is not associated with an SSB index greater than 60, then the RMSI CORESET is to be in the first frame.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 800 may be performed in parallel.

Figure 8:
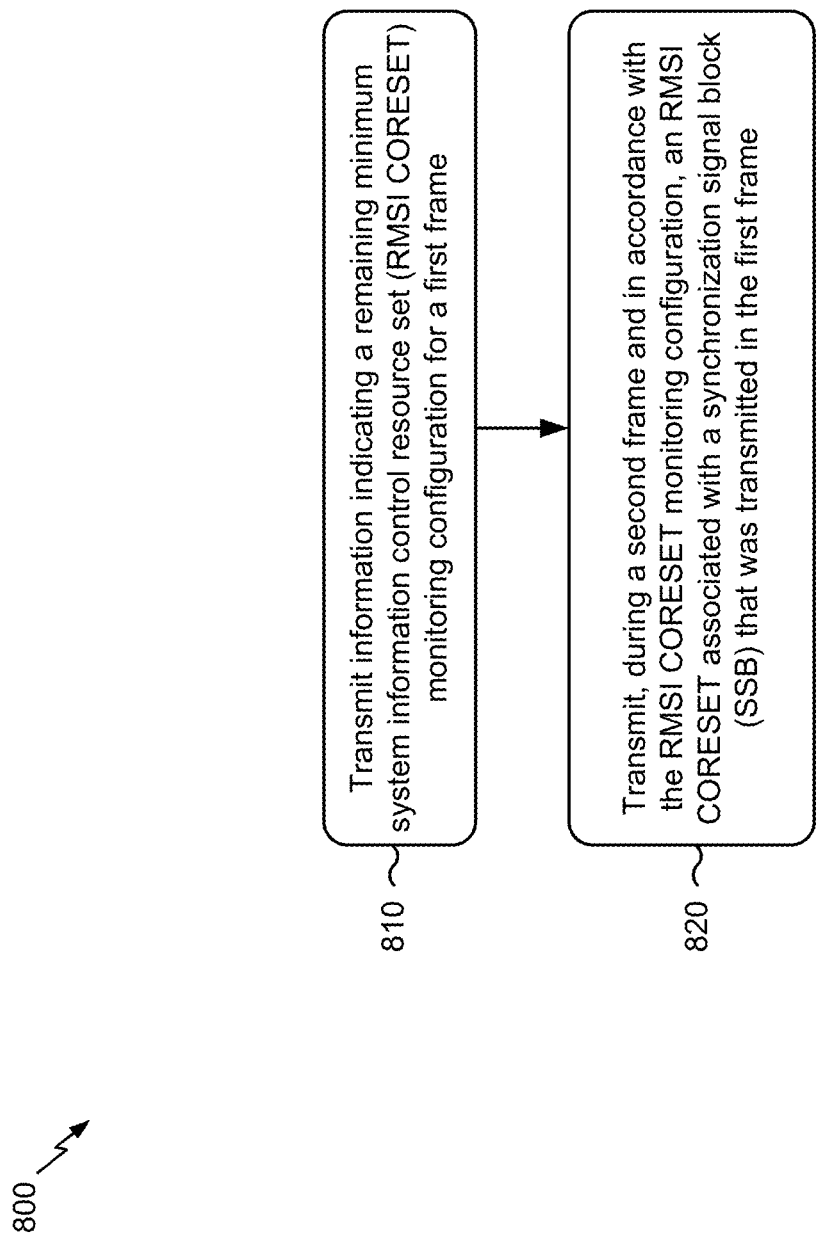
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where a base station (e.g., BS 110) performs determination of an RMSI according to a particular rule described herein.

As shown in FIG. 8, in some aspects, process 800 may include transmitting information indicating a remaining minimum system information control resource set (RMSI CORESET) monitoring configuration for a first frame (block 810). For example, the base station (e.g., using controller/processor 240, transmit processor 220, TX MIMO processor 230, MOD 232, antenna 234, and/or the like) may transmit information indicating a RMSI CORESET monitoring configuration of a UE (E.g., UE 120). The information indicating the RMSI CORESET monitoring configuration may include an SSB, a physical broadcast channel, and/or the like. The information indicating the RMSI CORESET monitoring configuration may be for a first frame and/or a second frame.

As shown in FIG. 8, in some aspects, process 800 may include transmitting, during a second frame and in accordance with the RMSI CORESET monitoring configuration, an RMSI CORESET associated with a synchronization signal block (SSB) that was transmitted in the first frame (block 820). For example, the base station (e.g., using controller/processor 240, transmit processor 220, TX MIMO processor 230, MOD 232, antenna 234, and/or the like) may transmit an RMSI CORESET based at least in part on the RMSI CORESET monitoring configuration. The base station may transmit the RMSI CORESET during a second frame. The base station may transmit the RMSI CORESET based at least in part on an SSB, associated with the RMSI CORESET, that was transmitted in the first frame.

Process 800 may include additional aspects, such as any single aspect or any combination of aspects described below and/or in connection with one or more other processes described elsewhere herein.

In some aspects, the second frame occurs after the first frame. In some aspects, the RMSI CORESET is transmitted after the SSB associated with the RMSI CORESET. In some aspects, a length of a time window for receiving the RMSI CORESET is based at least in part on the RMSI CORESET monitoring configuration. In some aspects, the base station (e.g., using controller/processor 240 and/or the like) may determine a modification period based at least in part on the RMSI CORESET monitoring configuration, wherein the modification period is longer than the first frame. In some aspects, the modification period includes at least part of the second frame.

In some aspects, the base station (e.g., using controller/processor 240 and/or the like) may determine an index of a first slot of the RMSI CORESET based at least in part on the RMSI CORESET monitoring configuration and the SSB. In some aspects, the base station may determine a location associated with the SSB based at least in part on an SSB bitmap, an index value of the SSB, and the RMSI CORESET monitoring configuration. In some aspects, the RMSI CORESET monitoring configuration is associated with a time offset value of 5 and a repetition frequency of 2 slots, and wherein the SSB is associated with an SSB index greater than 60. In some aspects, when the RMSI CORESET monitoring configuration is not associated with a time offset value of 5 and a repetition frequency of 2 slots, or when the SSB is not associated with an SSB index greater than 60, then the RMSI CORESET is to be in the first frame.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a first frame that includes one or more synchronization signal blocks (SSB), each SSB being associated with a respective remaining minimum system information (RMSI) control resource set (CORESET);
   determining, for at least one of the SSBs, an SSB index associated with the respective SSB;
   determining a time offset of the RMSI CORESET associated with the at least one of the SSBs;
   determining a repetition frequency of the RMSI CORESET associated with the at least one of SSBs;
   determining, for the at least one of the SSBs, a frame index associated with a frame that includes a monitoring occasion of the RMSI CORESET associated with the at least one of the SSBs based on the respective determined SSB index, time offset and repetition frequency, the determination of the frame index comprising:
   determining the frame index such that is associated with the first frame if $((O*2^\mu+[i*M])/N_{slot}^{frame,\mu}) \bmod 2 = 0$, and determining the frame index such that is associated with a second frame after the first frame if $((O*2^\mu+[i*M])/N_{slot}^{frame,\mu}) \bmod 2 = 1$;

determining a location of the monitoring occasion in the frame associated with the frame index, the determination of the location of the monitoring occasion comprising determining a location of a first slot in time of the monitoring occasion as $$n_0 = ((O*2^\mu + [i*M]) \bmod N_{slot}^{frame,\mu},$$

wherein $n_0$ is a slot index associated with the first slot, $O$ is the time offset, $M$ is the repetition frequency in slots, $\mu$ is a numerology index, and $N_{slot}^{frame,\mu}$ is a number of slots per frame;

monitoring, during the monitoring occasion in the frame associated with the frame index, for the RMSI CORESET associated with the at least one of the SSBs; and receiving the RMSI CORESET associated with the at least one of the SSBs based on the monitoring.

2. The method of claim 1, wherein the first frame includes an RMSI CORESET monitoring configuration that indicates the time offset and the repetition frequency.

3. The method of claim 1, wherein the determination of the frame index comprises determining the frame index such that $$SFN \bmod 2 = ((O*2^\mu + [i*M]) \bmod N_{slot}^{frame,\mu}) \bmod 2$$

is satisfied, wherein SFN is the frame index.

4. The method of claim 1, wherein the time offset is 5 milliseconds, the repetition frequency is 2 slots, and the SSB index is greater than 60.

5. The method of claim 1, wherein the time offset is not equal to 5 milliseconds, the repetition frequency is not equal to 2 slots, and the SSB index is not greater than 60, and wherein the determination of the frame index comprises determining the frame index such that it is associated with the first frame based on the time offset being not equal to 5 milliseconds, the repetition frequency being not equal to 2 slots, and the SSB index being not greater than 60.

6. A user equipment (UE) comprising:
at least one processor; and
at least one memory communicatively coupled with the at least one processor and storing processor-readable code that, when executed by the at least one processor is configured to cause the UE to:
receive a first frame that includes one or more synchronization signal blocks (SSB), each SSB being associated with a respective remaining minimum system information (RMSI) control resource set (CORESET);
determine, for at least one of the SSBs, an SSB index associated with the respective SSB;
determine a time offset of the RMSI CORESET associated with the at least one of the SSBs;
determine a repetition frequency of the RMSI CORESET associated with the at least one of SSBs;
determine, for the at least one of the SSBs, a frame index associated with a frame that includes a monitoring occasion of the RMSI CORESET associated with the at least one of the SSBs based on the respective determined SSB index, time offset and repetition frequency;
determine a location of the monitoring occasion in the frame associated with the frame index;
monitor, during the monitoring occasion in the frame associated with the frame index, for the RMSI CORESET associated with the at least one of the SSBs; and
receive the RMSI CORESET associated with the at least one of the SSBs based on the monitoring.

7. The UE of claim 6, wherein the first frame includes an RMSI CORESET monitoring configuration that indicates the time offset and the repetition frequency.

8. The UE of claim 6, wherein the determination of the frame index comprises determining the frame index such that $$SFN \bmod 2 = ((O*2^\mu + [i*M])/N_{slot}^{frame,\mu}) \bmod 2$$

is satisfied, wherein SFN is the frame index.

9. The UE of claim 6, wherein the time offset is 5 milliseconds, the repetition frequency is 2 slots, and the SSB index is greater than 60.

10. The UE of claim 6, wherein the time offset is not equal to 5 milliseconds, the repetition frequency is not equal to 2 slots, and the SSB index is not greater than 60, and wherein the determination of the frame index comprises determining the frame index such that it is associated with the first frame based on the time offset being not equal to 5 milliseconds, the repetition frequency being not equal to 2 slots, and the SSB index being not greater than 60.

* * * * *

UNITED STATES PATENT AND TRADEMARK OFFICE
CERTIFICATE OF CORRECTION

PATENT NO. : 11,039,327 B2
APPLICATION NO. : 16/250773
DATED : June 15, 2021
INVENTOR(S) : Makesh Pravin John Wilson It is certified that error appears in the above-identified patent and that said Letters Patent is hereby corrected as shown below:

In the Claims

The fourth and fifth "determine" operations of Claim 6 in Column 20, Lines 9-15 are replaced with the following:

--determine, for the at least one of the SSBs, a frame index associated with a frame that includes a monitoring occasion of the RMSI CORESET associated with the at least one of the SSBs based on the respective determined SSB index, time offset and repetition frequency, the determination of the frame index comprising:

determining the frame index such that it is associated with the first frame if
$$((O * 2^\mu + [i * M]) / N_{slot}^{frame,\mu}) \bmod 2 = 0, \text{ and}$$

determining the frame index such that it is associated with a second frame after the first frame if
$$((O * 2^\mu + [i * M]) / N_{slot}^{frame,\mu}) \bmod 2 = 1;$$

determine a location of the monitoring occasion in the frame associated with the frame index, the determination of the location of the monitoring occasion comprising determining a location of a first slot in time of the monitoring occasion as
$$n_0 = (O * 2^\mu + [i * M]) \bmod N_{slot}^{frame,\mu},$$

wherein $n_0$ is a slot index associated with the first slot, $O$ is the time offset, $M$ is the repetition frequency in slots, $\mu$ is a numerology index, and $N_{slot}^{frame,\mu}$ is a number of slots per frame;--

Signed and Sealed this
Thirtieth Day of August, 2022

*Katherine Kelly Vidal*

Katherine Kelly Vidal
*Director of the United States Patent and Trademark Office*